G. W. REAVES.
HARROW.
APPLICATION FILED DEC. 22, 1917.
1,266,049.
Patented May 14, 1918.
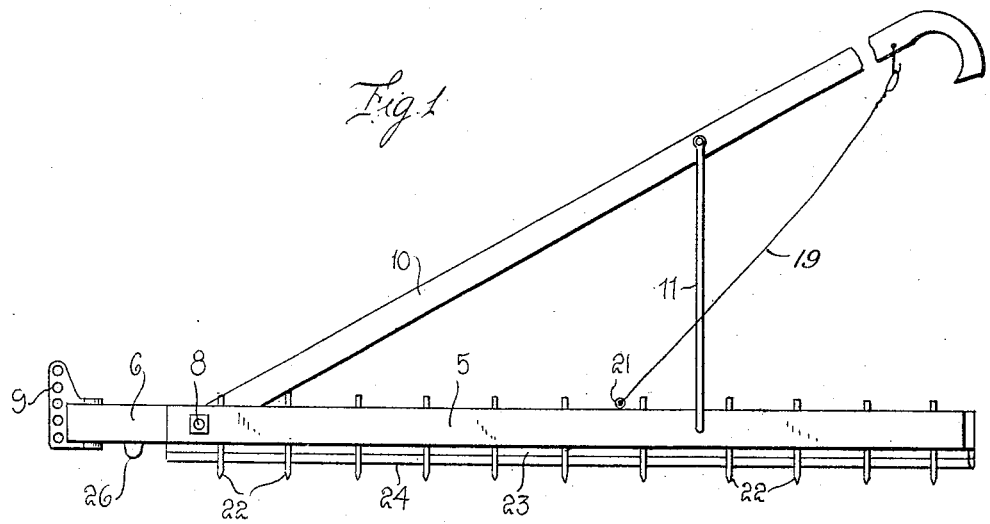
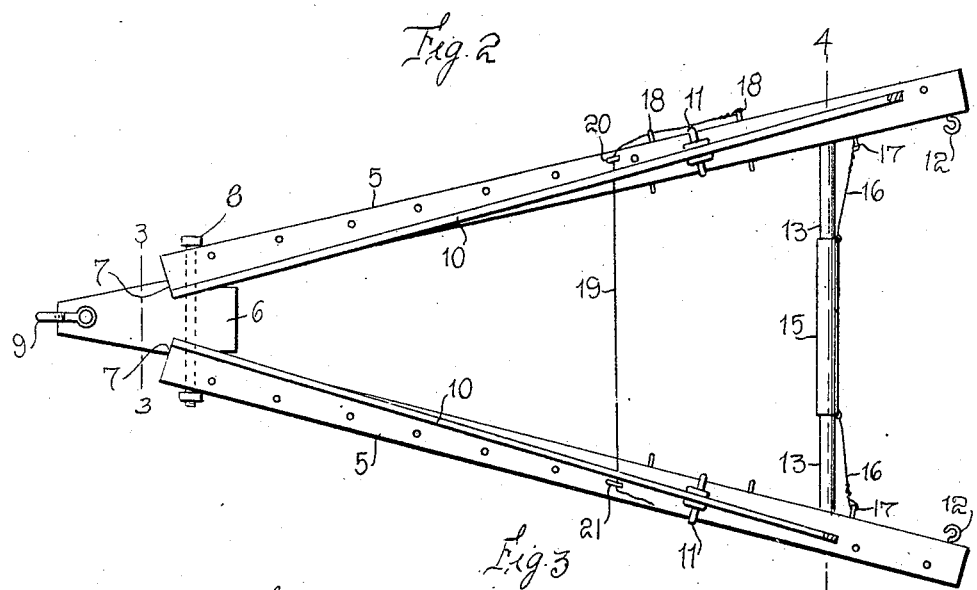
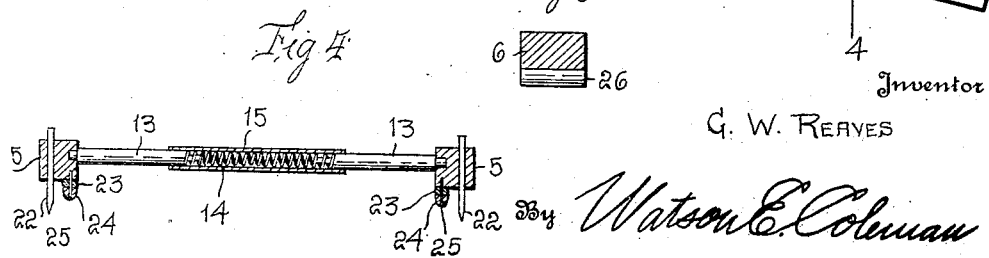
Inventor
G. W. REAVES
By Watson E. Coleman
Attorney

UNITED STATES PATENT OFFICE.

GEORGE W. REAVES, OF LITTLE ROCK, ARKANSAS.

HARROW.

1,266,049.  Specification of Letters Patent.  Patented May 14, 1918.

Application filed December 22, 1917. Serial No. 208,357.

*To all whom it may concern:*

Be it known that I, GEORGE W. REAVES, a citizen of the United States, residing at Little Rock, in the county of Pulaski and State of Arkansas, have invented certain new and useful Improvements in Harrows, of which the following is a specification, reference being had to the accompanying drawings.

This invention relates to an improved harrow and has for its primary object to provide a simply and durably constructed harrow for breaking up the top soil after a rain so that the moisture may seep into the earth and facilitate the growth of the plants.

It is another and more particular object of the invention to provide a harrow for the above purpose including harrow bars suitably connected at their forward ends to a draft beam, means arranged between the bars at their rear ends and yieldingly urging them apart, and manually operable means connected to the harrow bars at their latter ends for moving the bars toward each other.

It is also another important object of my invention to provide means on each of the harrow bars extending longitudinally thereof adjacent the harrow teeth for smoothing or packing the soil after it has been broken up by the teeth.

With the above and other objects in view, the invention consists in the improved combination, construction and arrangement of the several parts as will be hereinafter more fully described, subsequently claimed and illustrated in the accompanying drawings in which similar reference characters designate corresponding parts throughout the several views and wherein:

Figure 1 is a side elevation of a harrow constructed in accordance with one embodiment of the invention;

Fig. 2 is a top plan view;

Fig. 3 is a section taken on the line 3—3 of Fig. 2; and

Fig. 4 is a section taken on the line 4—4 of Fig. 2.

Referring in detail to the drawing 5 designates the harrow bars, which are preferably of rectangular form in cross section and may be constructed of wood or metal as desired. The forward ends of these bars are engaged against the opposite side faces of a beam 6 and in contact with the shoulders 7 formed thereon. The bars are loosely or pivotally connected to the rear end of this beam by a bolt indicated at 8, or any other suitable means. 9 designates a clevis connected to the beam 6.

The forward lower ends of handle bars 10 are engaged upon the bolt 8 between the beam 6 and the harrow bars 5. These bars at their other ends are provided with suitable handles and are supported by means of the brace rods 11 which are connected to said handle bars and extend transversely through the respective harrow bars 5. Suitable hooks or other fastening elements indicated at 12 are fixed in the rear ends of the bars 5 to which the ends of the handle bars may be connected when it is desired to operate the harrow with the diverging rear ends of the harrow bars in front.

In a socket in the inner face of each bar 5 adjacent to the rear end thereof, one end of a rod 13 is securely fixed. To the other ends of these rods the terminals of a coil spring 14 are secured. This spring is housed within and protected by a metal tube 15. Wires or other flexible elements 16 are attached at one of their ends to the respective ends of said tube and have their other ends secured to eyes indicated at 17 fixed in the respective harrow bars 5. The spring 14 yieldingly urges the rear ends of the harrow bars apart and maintains said bars in spaced diverging relation.

Screw eyes or guides 18 are fixed in one of the harrow bars on the outer side face thereof and through the same a wire or cable 19 extends. This wire also extends through an eye 20 fixed in the upper side of said harrow bar and then transversely between the harrow bars and through a guide eye 21 projecting from the upper face of the other bar 5. The wire 19 extends through one guide eye 18 and is attached at its end to the other eye 18 fixed in the bar 5. The other end of the wire 19 extends upwardly to one of the handle bars and is suitably secured thereto whereby it may be readily detached and adjusted. It will be understood from the above that simply pulling upon this wire 19, the two harrow bars 15 may be drawn or pulled inwardly toward each other to decrease the degree of divergence, as when harrowing between rows of small plants, and the bars are too widely spaced apart.

In the underside of each harrow bar 5, a longitudinally extending row of spikes or teeth 22 are secured. These harrow teeth may be of any approved form. To the bottom face of each harrow bar and extending longitudinally thereof along its inner edge a spacing strip or slat 23 and a molding strip 24 having a convex face are secured by means of the nails or screws 25. By the use of the slats 23, longer spikes or harrow teeth may be employed without necessitating the removal of the molding strip. When relatively short harrow teeth are used, the slats 23 are dispensed with, and the molding strips secured directly to the bottom faces of the harrow bars.

To the under side of the beam 6, an additional molding strip 26 is secured so that the beam will ride easily over the ridges in which the seed have been planted.

From the foregoing description taken in connection with the accompanying drawings, the construction, manner of operation and several advantages of my invention will be more fully understood. The harrow, as above described, is strong and durable in its construction, and the earth or top soil may be broken up after a rain, so that the water can seep into the soil to the plant seed, and thereby expedite their growth. The harrow bars may be easily and quickly adjusted toward each other at their rear ends when the plant rows are close together. It will be understood of course that any desired number of harrow teeth may be provided upon each of the bars 5, and that if desired, the molding strips 24 can be dispensed with. However, in the initial harrowing operation, before the foliage appears above the ground surface, these strips should be used in order that the possibility of uncovering or exposing the seed may be obviated.

While I have herein shown and described the preferred construction and arrangement of the several elements, it is to be understood that the harrow is susceptible of considerable modification therein, and I therefore reserve the privilege of adopting all such legitimate changes as may be fairly embodied within the spirit and scope of the invention as claimed.

Having thus fully described my invention, what I claim and desire to secure by Letters Patent is:—

1. In a harrow, spaced harrow bars, a draft beam, means pivotally connecting the forward ends of the harrow bars to said beam, handles supported above the respective harrow bars, a flexible element attached to one of the harrow bars, and guides in the other harrow bar through which said flexible element extends, said flexible element being manually operable to move the harrow bars at their rear ends toward each other.

2. In a harrow, spaced harrow bars, means supporting said bars at their forward ends for movement toward or from each other, a spring arranged between the bars adjacent their rear ends and urging the same apart, a sheath for said spring flexibly connected at its ends to the respective harrow bars, and manually operable means connecting the bars to each other and whereby they may be moved toward each other against the action of said spring.

In testimony whereof I hereunto affix my signature in the presence of two witnesses.

GEORGE W. REAVES.

Witnesses:
R. W. POLK,
LEN JARRETT.

Copies of this patent may be obtained for five cents each, by addressing the "Commissioner of Patents. Washington, D. C."